(12) United States Patent
Tamura et al.

(10) Patent No.: US 10,792,995 B2
(45) Date of Patent: Oct. 6, 2020

(54) IN-WHEEL MOTOR DRIVE DEVICE (71) Applicant: NTN CORPORATION, Osaka (JP)

(72) Inventors: Shiro Tamura, Shizuoka (JP); Shinya Taikou, Shizuoka (JP)

(73) Assignee: NTN CORPORATION, Osaka (JP)

(*) Notice: Subject to any disclaimer, the term of this patent is extended or adjusted under 35 U.S.C. 154(b) by 106 days.

(21) Appl. No.: 16/078,174

(22) PCT Filed: Nov. 24, 2016

(86) PCT No.: PCT/JP2016/084813
§ 371 (c)(1),
(2) Date: Aug. 21, 2018

(87) PCT Pub. No.: WO2017/158933
PCT Pub. Date: Sep. 21, 2017

(65) Prior Publication Data
US 2019/0047401 A1 Feb. 14, 2019

(30) Foreign Application Priority Data

Mar. 14, 2016 (JP) .................................. 2016-049719
Oct. 11, 2016 (JP) .................................. 2016-200230

(51) Int. Cl.
*B60K 7/00* (2006.01)
*B60K 17/14* (2006.01)
(Continued)

(52) U.S. Cl.
CPC .......... *B60K 7/0007* (2013.01); *B60K 17/043* (2013.01); *B60K 17/14* (2013.01);
(Continued)

(58) Field of Classification Search
CPC .. B60K 7/0007; B60K 17/145; B60K 17/043; B60K 17/14; B60K 2007/0038;
(Continued)

(56) References Cited

U.S. PATENT DOCUMENTS 2,087,229 A * 7/1937 Baffi ...................... G01F 3/225
73/268
5,048,626 A * 9/1991 Strehler ............... B60K 7/0007
180/19.2
(Continued)

FOREIGN PATENT DOCUMENTS

EP    3 428 479    1/2019
JP    2009-090921  4/2009
(Continued)

*Primary Examiner* — Jacob B Meyer
(74) *Attorney, Agent, or Firm* — Clark & Brody LP (57) ABSTRACT

A speed reduction unit (31) includes an input shaft (32) coupled to a motor rotary shaft (22) of a motor unit (21), an input gear (33) coupled to the input shaft, a cylindrical output shaft (41) coupled to an outer ring (12), and an output gear (40) coupled to the output shaft, and constructs a driving-force transmission path that reduces the rotational speed of the input gear and transmits the reduced rotational speed to the output gear. The output shaft is rotatably supported at both ends by a first output-shaft bearing (44) rotatably supporting an outer diameter of an axially outer end side of the output shaft and a second output-shaft bearing (46) rotatably supporting an inner diameter of an axially inner end side of the output shaft.

12 Claims, 6 Drawing Sheets

(51) Int. Cl.
*F16C 19/18* (2006.01)
*F16C 35/063* (2006.01)
*F16C 35/067* (2006.01)
*B60K 17/04* (2006.01)
*F16C 19/06* (2006.01)

(52) U.S. Cl.
CPC .......... B60K 17/145 (2013.01); F16C 19/184 (2013.01); F16C 35/063 (2013.01); F16C 35/067 (2013.01); *B60K 2007/0038* (2013.01); *B60K 2007/0061* (2013.01); *F16C 19/06* (2013.01); *F16C 2326/02* (2013.01); *F16C 2361/61* (2013.01); *Y02T 10/641* (2013.01)

(58) Field of Classification Search
CPC ........... B60K 2007/0061; F16C 35/067; F16C 19/184; F16C 35/063; F16C 2361/61; F16C 19/06; F16C 2326/02; Y02T 10/641
See application file for complete search history.

(56) References Cited

U.S. PATENT DOCUMENTS

| | | | | |
|---|---|---|---|---|
| 5,691,584 A * | 11/1997 | Toida | ................... | B60K 7/0007 180/65.51 |
| 5,907,973 A * | 6/1999 | Van Wonterghem | ........................ | B60K 17/08 180/374 |
| 7,370,714 B2 * | 5/2008 | Yasuda | .............. | A01D 34/6806 180/305 |
| 7,703,780 B2 * | 4/2010 | Mizutani | .................. | B60G 3/20 280/124.1 |
| 8,261,866 B2 * | 9/2012 | Ishida | .................. | B60K 7/0007 180/65.51 |
| 8,490,729 B2 * | 7/2013 | Walser | ................. | B60K 7/0007 180/65.51 |
| 8,596,395 B2 * | 12/2013 | Hirano | ................. | B60K 7/0007 180/65.51 |
| 8,720,623 B1 * | 5/2014 | Kim | ..................... | B60K 17/043 180/65.51 |
| 9,130,412 B2 * | 9/2015 | Tamura | ................ | B60K 17/356 |
| 9,403,429 B2 * | 8/2016 | Baumgartner | ....... | B60K 7/0007 |
| 9,592,732 B2 * | 3/2017 | Frohnmayer | .......... | B60K 17/08 |
| 9,636,999 B2 * | 5/2017 | Shin | ..................... | B60K 17/046 |
| 9,821,649 B2 * | 11/2017 | Ishikawa | ................... | F16D 1/10 |
| 9,931,888 B2 * | 4/2018 | Hirano | ................... | F16D 1/076 |
| 10,543,742 B2 * | 1/2020 | Tamura | .................... | B60K 17/14 |
| 2008/0035407 A1 * | 2/2008 | Murata | ................ | B60K 7/0015 180/308 |
| 2008/0223638 A1 * | 9/2008 | Niwa | .................... | B60K 7/0007 180/65.51 |
| 2008/0308330 A1 * | 12/2008 | Murata | .................. | B60G 7/005 180/65.51 |
| 2012/0248850 A1 * | 10/2012 | Hirano | ................. | B60K 7/0007 301/6.5 |
| 2013/0337959 A1 * | 12/2013 | Suzuki | ................. | H02K 5/1732 475/149 |
| 2014/0031160 A1 * | 1/2014 | Suzuki | .................. | H02K 7/116 475/149 |
| 2015/0158381 A1 * | 6/2015 | Shin | ..................... | B60K 17/043 475/149 |
| 2015/0266373 A1 * | 9/2015 | Wang | ..................... | B60K 17/08 180/364 |
| 2018/0264929 A1 * | 9/2018 | Tamura | ................... | B60B 35/14 |
| 2018/0272855 A1 * | 9/2018 | Tamura | ............... | B60B 27/0026 |
| 2019/0047400 A1 * | 2/2019 | Tamura | .................... | B60W 10/08 |
| 2019/0047401 A1 * | 2/2019 | Tamura | ............... | F16C 35/067 |
| 2019/0054819 A1 * | 2/2019 | Tamura | .................... | B60K 7/00 |
| 2019/0077342 A1 * | 3/2019 | Okamoto | ................ | B60R 16/03 |
| 2019/0084405 A1 * | 3/2019 | Tamura | ................ | B60K 17/046 |
| 2019/0241059 A1 * | 8/2019 | Tamura | .................... | B60K 17/14 |
| 2019/0248224 A1 * | 8/2019 | Tamura | .................... | H02K 7/006 |
| 2019/0273412 A1 * | 9/2019 | Taikou | .................. | H02K 7/1846 |
| 2019/0299769 A1 * | 10/2019 | Li | ............................ | B60K 7/00 |
| 2020/0016972 A1 * | 1/2020 | Tamura | ................ | B60K 17/043 |
| 2020/0039308 A1 * | 2/2020 | Tamura | .................... | B60K 7/00 |
| 2020/0039343 A1 * | 2/2020 | Taikou | ................ | B60K 17/043 |
| 2020/0039344 A1 * | 2/2020 | Taikou | .................... | F16H 1/06 |
| 2020/0044513 A1 * | 2/2020 | Taikou | ................... | H02K 7/116 |

FOREIGN PATENT DOCUMENTS

| | | |
|---|---|---|
| JP | 2010-111362 | 5/2010 |
| JP | 2013-071685 | 4/2013 |
| JP | 2013-514222 | 4/2013 |
| JP | 2014-073730 | 4/2014 |
| JP | 5677142 | 2/2015 |
| WO | 2015/141387 | 9/2015 |

\* cited by examiner

FIG. 1 outer side in vehicle width direction
←

FIG. 2

FIG. 3 outer side in vehicle width direction →

FIG. 4 outer side in vehicle width direction ←

FIG. 5 outer side in vehicle width direction
←

FIG. 6 outer side in vehicle width direction ←

IN-WHEEL MOTOR DRIVE DEVICE

TECHNICAL FIELD

The present invention relates to an in-wheel motor drive device that is disposed inside a wheel to drive the wheel, and more particularly, to a structure for rotatably supporting an output shaft of a speed reduction unit.

BACKGROUND ART

It is a common practice for in-wheel motors, which are disposed inside a wheel assembly and drive the wheel assembly, to include a wheel hub bearing rotatably supporting a wheel hub, and to bear a wheel load on the wheel hub coupled to a wheel. For instance, Japanese Patent No. 5677142 (PTL 1) discloses a wheel hub bearing that is installed in an annular gap between a cylindrical outer ring hub coupled to a wheel of a rear wheel assembly and a spindle passing through a center bore of the outer ring hub.

A gear is provided around the outer circumference of the outer ring hub in PTL 1, and the gear is in mesh with a pinion. The pinion receives rotation of the motor and transmits it to the outer ring hub.

CITATION LIST

Patent Literature

[PTL 1] Japanese Patent No. 5677142

SUMMARY OF INVENTION

Technical Problem

However, the inventors of this invention have discovered that the aforementioned conventional wheel hub bearing is still susceptible to improvement. Since the gear coupled around the outer circumference of the outer ring hub is supported by the wheel hub bearing, an external force applied from the wheel assembly may sometimes displace the gear. The undesired displacement of the gear, which is one of components making up a driving-force transmission path extending from the motor to the wheel hub, causes uneven wear and some other deficiencies that impair the durability of the in-wheel motor.

The present invention has been made in view of the aforementioned circumstances, and has an object to provide a structure for stably supporting a final gear of a speed reduction unit that reduces the rotational speed of the motor and transmits the reduced rotational speed to the wheel hub.

Solution to Problem

To achieve the object, the in-wheel motor drive device of the present invention includes a motor unit that drives a wheel, a wheel hub bearing unit to which the wheel is attached, and a speed reduction unit that reduces the rotational speed of the motor unit and transmits the reduced rotational speed to the wheel hub bearing unit. The wheel hub bearing unit includes a rotary ring rotating together with the wheel, a stationary ring disposed coaxially with the rotary ring, and a plurality of rolling elements arranged in an annular gap between the rotary ring and the stationary ring. The speed reduction unit includes an input shaft coupled to a motor rotary shaft of the motor unit, an input gear coupled to the input shaft, an output shaft coupled to the rotary ring of the wheel hub bearing unit, and an output gear coupled to the output shaft, and constructs a driving-force transmission path that reduces the rotational speed of the input gear and transmits the reduced rotational speed to the output gear. The output shaft is rotatably supported at both ends by a first output-shaft bearing rotatably supporting an outer end side of the output shaft and a second output-shaft bearing rotatably supporting an inner end side of the output shaft.

According to the invention, the output shaft can be stably supported at both ends by, in addition to the wheel hub bearing unit, the speed reduction unit including the output shaft coupled to the rotary ring, the first output-shaft bearing rotatably supporting one of the ends of the output shaft and the second output-shaft bearing rotatably supporting the remaining end of the output shaft. Even if an external force is applied from the wheel to the outer ring, this configuration can restrict the displacement of the output shaft, and therefore can prevent the gear of the speed reduction unit from uneven wearing and other damage.

The rotary ring and stationary ring of the wheel hub bearing unit are an outer ring and an inner ring of a rolling bearing. In an embodiment, the rotary ring is the outer ring, and the stationary ring is included in the stationary shaft passing through a center bore of the outer ring.

The positions where the first output-shaft bearing and second output-shaft bearing are disposed are not particularly limited. In an embodiment, the first output-shaft bearing rotatably supports an outer diameter of the outer end side of the output shaft, and the second output-shaft bearing rotatably supports an inner diameter of the inner end side of the output shaft. According to the embodiment, the output shaft can be stably supported at both ends by, in addition to the wheel hub bearing unit, the speed reduction unit including the cylindrical output shaft coupled to the outer ring, the first output-shaft bearing rotatably supporting one of the ends of the output shaft and the second output-shaft bearing located opposite to the first output-shaft bearing and rotatably supporting the remaining end of the output shaft. Even if an external force is applied from the wheel to the outer ring, the configuration can restrict the displacement of the output shaft, and therefore can prevent the gear of the speed reduction unit from uneven wearing and other damage.

According to the embodiment, the output shaft is stably supported on both the inner diameter and outer diameter by the first output-shaft bearing rotatably supporting the outer diameter of the outer end side of the output shaft and the second output-shaft bearing rotatably supporting the inner diameter of the inner end side of the output shaft. Even if an external force is applied from the wheel to the outer ring, the configuration can restrict the displacement of the output shaft, and therefore can prevent the gear of the speed reduction unit from uneven wearing and other damage. The structure of the first and second output-shaft bearings is not particularly limited, but they are preferably rolling bearings. The first and second output-shaft bearings are, for example, ball bearings, cylindrical roller bearings, rolling bearings, radial bearings, or angular bearings. The first output-shaft bearing rotatably supporting the outer diameter of the output shaft describes the situation where, for example, the output shaft has an outer circumferential surface, and the first output-shaft bearing is disposed radially outward of the outer circumferential surface to rotatably support the output shaft. The second output-shaft bearing rotatably supporting the inner diameter of the output shaft describes the situation where, for example, the output shaft is shaped into a hollow cylinder having an inner circumferential surface, and the second output-shaft bearing is disposed radially inward of the inner circumferential surface to rotatably support the output shaft.

In a preferable embodiment of the invention, the output shaft has a first circular step formed on the outer circumference of an outer end portion thereof so that the output shaft has a larger diameter around the center thereof, and the position of the first output-shaft bearing in the direction of the axis is regulated by the first circular step. According to the embodiment, the first circular step is oriented outward in the axial direction, and can restrict the displacement of the first output-shaft bearing to prevent the first output-shaft bearing from moving inward in the axial direction.

In a preferable embodiment of the invention, the output shaft has a second circular step formed on the inner circumference of an inner end portion thereof so that the output shaft has a smaller diameter around the center thereof, and the position of the second output-shaft bearing in the direction of the axis is regulated by the second circular step. According to the embodiment, the second circular step is oriented inward in the axial direction, and can restrict the displacement of the second output-shaft bearing to prevent the second output-shaft bearing from moving outward in the axial direction.

In a more preferable embodiment of the invention, the output gear is a helical gear. According to the embodiment, the output gear can obtain good tooth contact. In addition, the first and second output-shaft bearings that are fixed so as not to displace in the axial direction can receive the axial force acting on the helical gear.

The components that support the first and second output-shaft bearings are not particularly limited. The first and second output-shaft bearings are supported by, for example, a casing of the in-wheel motor drive device. In an embodiment of the invention, the second output-shaft bearing is provided between the inner circumferential surface of the output shaft and the outer circumferential surface of the stationary shaft. According to the embodiment, the output shaft can be supported by the stationary shaft with a strength higher than that of the casing of the in-wheel motor drive device. In another embodiment, the casing may be provided with a cylindrical portion that supports the second output-shaft bearing.

In a preferable embodiment of the invention, the outer ring is disposed on the axially outer side of the wheel hub bearing unit, the output shaft is disposed on the axially inner side of the wheel hub bearing unit, and the outer ring and the output shaft are coupled to each other such that the inner circumferential surface of the axially outer end portion of the output shaft is laid over the outer circumferential surface of the axially inner end portion of the outer ring. The first output-shaft bearing rotatably supports the outer circumferential surface of the outer end portion of the output shaft, while the second output-shaft bearing rotatably supports the inner circumferential surface of the inner end portion of the output shaft. According to the embodiment, the first output-shaft bearing can be disposed where the outer ring of the wheel hub bearing unit and the output shaft of the speed reduction unit are coupled with each other. Therefore, the position of the first output-shaft bearing in the axial direction can be overlapped the position of the outer ring in the axial direction, thereby reducing the total dimension of the outer ring and output shaft in the axial direction. In another embodiment, the first and second output-shaft bearings may be disposed apart from the outer ring of the wheel hub bearing unit in the axial direction.

In a more preferable embodiment of the invention, the output gear is disposed on the outer circumference of the axially inner end portion of the output shaft, and the position of the output gear in the axial direction overlaps the position of the second output-shaft bearing in the axial direction. According to the embodiment, the dimension of the output shaft in the axial direction can be reduced. In another embodiment, the output gear may be disposed between the first output-shaft bearing and the second output-shaft bearing.

In an embodiment of the invention, the first output-shaft bearing is a radial bearing including an outer raceway disposed on a radially outer side, an inner raceway disposed on a radially inner side, and a plurality of rolling elements rolling on the outer raceway and inner raceway, and the maximum outer diameter of the outer raceway is smaller than the outer diameter of the output gear. According to the embodiment, the diameter of the first output-shaft bearing can be reduced, and the diameter of the wheel hub bearing unit can be further reduced accordingly. Resultantly, a space for the wheel hub bearing unit can be provided in a hollow area in the wheel. The maximum outer diameter of the outer raceway denotes a part of the outer raceway having the largest outer diameter. In a case where the outer raceway is in the shape of a semicircular groove in cross section, for example, the maximum outer diameter of the outer raceway is the outer diameter of a circle formed by the bottom line of the groove. In another embodiment, the maximum outer diameter of the outer raceway may be larger than the outer diameter of the output gear.

In another embodiment of the invention, the stationary ring is an outer ring, the rotary ring is an inner ring disposed in a center bore of the outer ring. The inner ring may be an annular member or a cylindrical solid shaft.

In a preferable embodiment of the invention, the first output-shaft bearing and second output-shaft bearing are supported by the casing of the speed reduction unit. Specifically, for example, an inner circumferential surface is formed in the casing, the output shaft is disposed so that its outer circumferential surface faces the inner circumferential surface of the casing, and the first output-shaft bearing and/or the second output-shaft bearing is disposed between the inner circumferential surface of the casing and the outer circumferential surface of the output shaft. Alternatively, the first output-shaft bearing and/or the second output-shaft bearing may be disposed between the outer circumferential surface of the casing and the inner circumferential surface of the output shaft. Alternatively, the first output-shaft bearing and/or the second output-shaft bearing may be disposed at other places.

Advantageous Effects of Invention

According to the present invention, the output gear, which is the final gear in the speed reduction unit, can be supported with stability. Even if an external force is applied from the wheel to the outer ring, the aforementioned embodiments of the invention can restrict the displacement of the output shaft to thereby prevent the gear of the speed reduction unit from uneven wearing and other damage, and therefore provide the in-wheel motor drive device with improved durability.

DESCRIPTION OF EMBODIMENT

Figure 1:
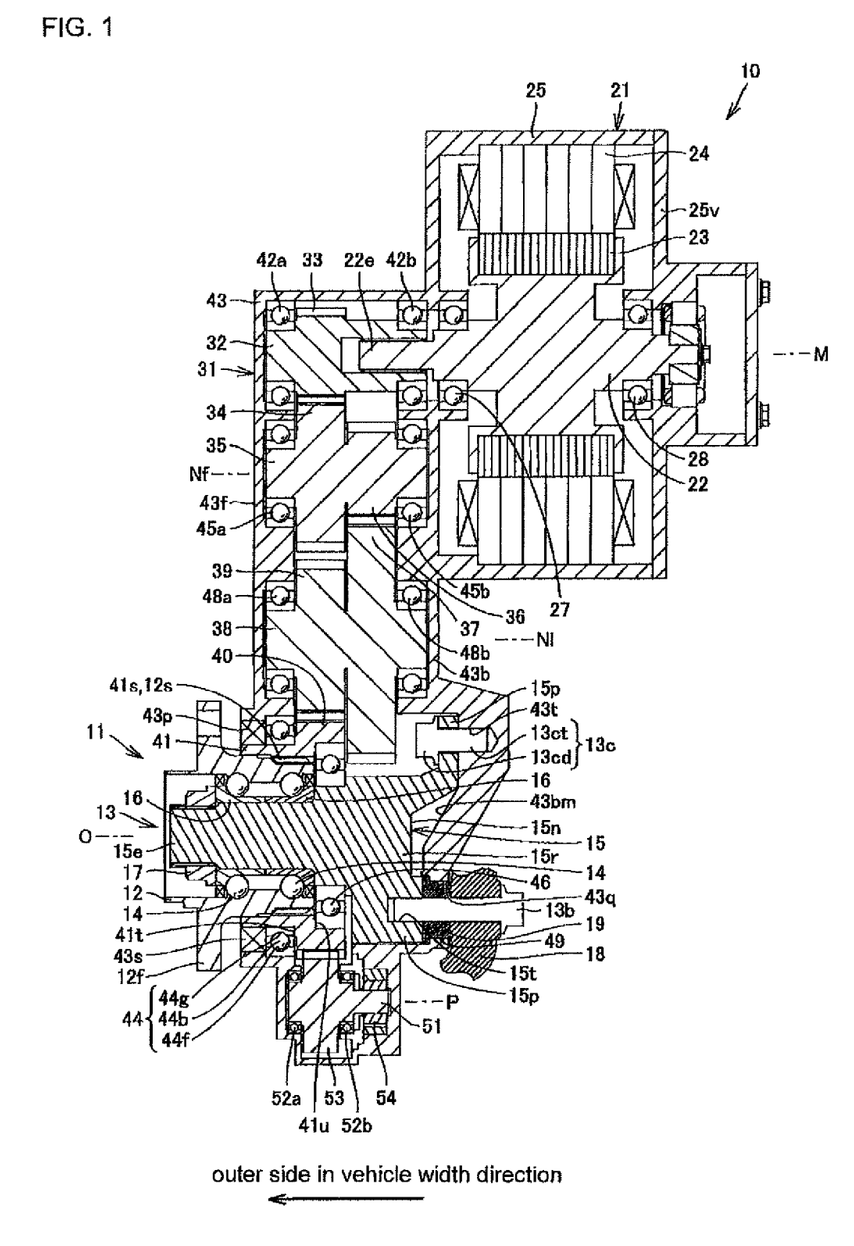
FIG. 1 is a developed cross-sectional view of an in-wheel motor drive device according to the first embodiment of the present invention, the in-wheel motor drive device being cut along a predetermined plane and developed.
Figure 2:
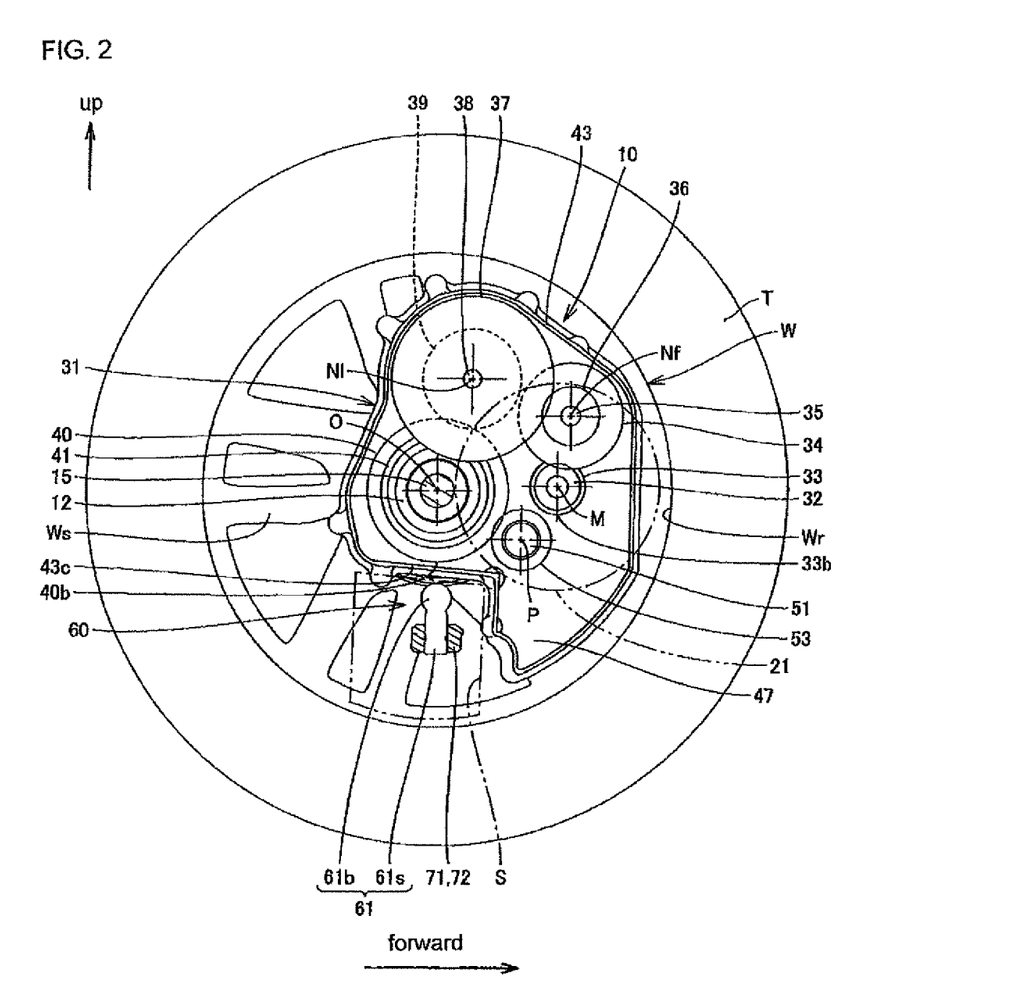
FIG. 2 is a back view showing the inside of the in-wheel motor drive device of the first embodiment with a wheel assembly.

With reference to the accompanying drawings, embodiments of the present invention will be described below. FIG. 1 is a developed cross-sectional view of an in-wheel motor drive device according to the first embodiment of the present invention, the in-wheel motor drive device being cut along a predetermined plane and developed. FIG. 2 is a back view showing the inside of the in-wheel motor drive device of the first embodiment with a wheel assembly, viewed from the right side of FIG. 1, with a motor unit 21 and a back part 43b of a main casing 43 removed from the in-wheel motor drive device 10 in FIG. 1. The predetermined plane shown in FIG. 1 is a developed plane made by connecting a plane including an axis M and an axis Nf, a plane including the axis Nf and an axis Nl, and a plane including the axis Nl and an axis O, shown in FIG. 2, in this order.

The in-wheel motor drive device 10 includes a wheel hub bearing unit 11 coupled to the center of a road wheel, a motor unit 21 driving the road wheel W of a wheel assembly, and a speed reduction unit 31 reducing the rotational speed of the motor unit and transmitting the reduced rotational speed to the wheel hub bearing unit 11, and the in-wheel motor drive device 10 is disposed in a wheel housing (not shown) of an electric vehicle. The motor unit 21 and speed reduction unit 31 are not arranged coaxially with the axis O of the wheel hub bearing unit 11, but are offset from the axis O of the wheel hub bearing unit 11 as shown in FIG. 2. The road wheel W is a well-known wheel with a tire T fitted on the outer circumference of the road wheel W, and is attached to the front left, front right, rear left, and rear right of a vehicle body. The vehicle body and wheels construct an electric vehicle. The in-wheel motor drive device 10 allows the electric vehicle to move at 0 to 180 km/h on public roads.

The wheel hub bearing unit 11 includes an outer ring 12 serving as a wheel hub coupled to the road wheel W, an inner stationary member 13 passing through a center bore of the outer ring 12, and a plurality of rolling elements 14 arranged in an annular gap between the outer ring 12 and inner stationary member 13, and the wheel hub bearing unit 11 constructs an axle. The inner stationary member 13 includes a non-rotational stationary shaft 15, a pair of inner races 16, and a locknut 17. The stationary shaft 15 has a top portion 15e and a root portion 15r having a diameter greater than that of the top portion 15e. The inner races 16 fit around the outer circumference of the stationary shaft 15 between the root portion 15r and top portion 15e. The locknut 17 is threadedly engaged with the top portion 15e of the stationary shaft 15 to secure the inner races 16 between the locknut 17 and root portion 15r.

The stationary shaft 15 extends along the axis O, and the top portion 15e of the stationary shaft 15 is oriented outward in the vehicle width direction. The root portion 15r of the stationary shaft 15 projects inward in the vehicle width direction, and faces the back part 43b of the main casing 43. The root portion 15r is attached and secured to the back part 43b in the interior of the main casing 43 with a bolt 13c. The root portion 15r is also coupled to a carrier 18 on the outside of the main casing 43 with a bolt 13b.

The rolling elements 14 are arranged in double rows separately in the axis-O direction. The outer circumferential surface of one of the inner races 16 situated on the outer side in the axis-O direction serves as an inner raceway for the first-row rolling elements 14, and faces the inner circumferential surface of an axially outer side of the outer ring 12 in the axis-O direction. The outer circumferential surface of the other inner race 16 situated on the inner side in the axis-O direction serves as an inner raceway for the second-row rolling elements 14, and faces the inner circumferential surface of an axially inner side of the outer ring 12 in the axis-O direction. In the following description, the outer side (outboard side) in the vehicle width direction may be referred to as an axially outer side, and the inner side (inboard side) in the vehicle width direction may be referred to as an axially inner side. The right-left direction of FIG. 1 corresponds to the vehicle width direction. The inner circumferential surface of the outer ring 12 constructs an outer raceway for the rolling elements 14.

The outer ring 12 has a flange 12f formed at an axially outer end thereof in the axis-O direction. The flange 12f constructs a coupling seat to coaxially couple with a brake rotor, which is not illustrated, and a spoke section Ws of the road wheel W. The outer ring 12 is coupled to the road wheel W with the flange 12f, and rotates together with the road wheel W.

The motor unit 21 includes, as shown in FIG. 1, a motor rotary shaft 22, a rotor 23, a stator 24, a motor casing 25, and a motor casing cover 25v, that are arranged in this order radially outward from the axis M of the motor unit 21. The motor unit 21 is a radial gap motor of an inner rotor and outer stator type, but may be other types of motors. For instance, although it is not illustrated, the motor unit 21 can be an axial gap motor.

The axis M, which is the center of rotation of the motor rotary shaft 22 and rotor 23, extends in parallel with the axis O of the wheel hub bearing unit 11. In other words, the motor unit 21 is disposed to offset from the axis O of the wheel hub bearing unit 11. Except for a tip portion of the motor rotary shaft 22, the position of most of the motor unit 21 in the axial direction does not overlap the position of the inner stationary member 13 in the axial direction, as shown in FIG. 1. The motor casing 25 is substantially cylindrical, and has an axially outer end in the axis-M direction coupled to the back part 43b of the main casing 43, and an axially inner end in the axis-M direction shielded with the bowl-like motor casing cover 25v. The opposite ends of the motor rotary shaft 22 are rotatably supported by the motor casing 25 with rolling bearings 27, 28. The motor unit 21 drives the outer ring 12.

The speed reduction unit 31 includes an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the main casing 43. The input shaft 32 is a tubular component having a diameter greater than that of a tip portion 22e of the motor rotary shaft 22, and extends along the axis M of the motor unit 21. The tip portion 22e is received in a center bore formed in an axially inner end portion of the input shaft 32 in the axis-M direction, resultantly coaxially coupling the input shaft 32 with the motor rotary shaft 22. The input shaft 32 is supported at both ends by the main casing 43 with rolling bearings 42a, 42b. The input gear 33 is an external gear having a diameter smaller than that of the motor unit 21, and is coaxially coupled to the input shaft 32. Specifically, the input gear 33 is integrally formed on the outer circumference of the input shaft 32, and is located at a center part of the input shaft 32 in the axis-M direction. FIG. 2 and later figures represent the gears as addendum circles without depicting individual teeth of the gears.

The output shaft 41 is a tubular component having a diameter greater than that of the outer ring 12, and extends along the axis O of the wheel hub bearing unit 11. An axially inner end of the outer ring 12 in the axis-O direction is received in a center bore formed in an axially outer end of the output shaft 41 in the axis-O direction, resultantly coaxially coupling the outer ring 12 to the output shaft 41. Specifically, spline grooves 41s are formed in the inner circumferential surface of the output shaft 41, while spline grooves 12s are formed in the outer circumferential surface of the axially inner end of the outer ring 12 in the axis-O direction, and the spline grooves 41s, 12s are spline-fitted to one another. The spline fitting achieves torque transmission between the output shaft 41 and outer ring 12 and also permits the output shaft 41 and outer ring 12 to move relatively.

The axially outer end of the output shaft 41 in the axis-O direction is supported by the main casing 43 with a rolling bearing 44. An axially inner end of the output shaft 41 in the axis-O direction is supported by the root portion 15r of the stationary shaft 15 with a rolling bearing 46. The output gear 40 is an external gear, and is coaxially coupled to the output shaft 41. Specifically, the output gear 40 is integrally formed on the outer circumference of the output shaft 41, and is located at the axially inner end of the output shaft 41 in the axis-O direction.

The two intermediate shafts 35, 38 extend in parallel with the input shaft 32 and output shaft 41. Specifically, the speed reduction unit 31 is a parallel four-shaft gear reducer and the axis O of the output shaft 41, the axis Nf of the intermediate shaft 35, the axis Nl of the intermediate shaft 38, and the axis M of the input shaft 32 extend in parallel with one another, in other words, extend in the vehicle width direction.

In terms of positions of the shafts with respect to the front-rear direction of the vehicle, as shown in FIG. 2, the axis M of the input shaft 32 is positioned forward of the axis O of the output shaft 41. The axis Nf of the intermediate shaft 35 is also positioned forward of the axis M of the input shaft 32. The axis Nl of the intermediate shaft 38 is positioned forward of the axis O of the output shaft 41, and rearward of the axis M of the input shaft 32. In a modification which is not illustrated, the input shaft 32, intermediate shaft 35, intermediate shaft 38, and output shaft 41 may be disposed in this order in the front-rear direction of the vehicle. This order is also the order in which a driving force is transmitted.

In terms of positions of the shafts with respect to the up-down direction, the axis M of the input shaft 32 is positioned higher than the axis O of the output shaft 41. The axis Nf of the intermediate shaft 35 is positioned higher than the axis M of the input shaft 32. The axis Nl of the intermediate shaft 38 is positioned higher than the axis Nf of the intermediate shaft 35. In a modification which is not illustrated, the intermediate shaft 35 may be disposed higher than the intermediate shaft 38, but both the intermediate shafts 35, 38 need to be disposed higher than the input shaft 32 and output shaft 41. In an alternative modification which is not illustrated, the output shaft 41 may be disposed higher than the input shaft 32.

The intermediate gear 34 and intermediate gear 36, which are external gears, as shown in FIG. 1, are coaxially coupled to the intermediate shaft 35, and are located at a center part of the intermediate shaft 35 in the axis-Nf direction. The intermediate shaft 35 is supported at both ends by the main casing 43 with rolling bearings 45a, 45b. The intermediate gear 37 and intermediate gear 39, which are external gears, are coaxially coupled to the intermediate shaft 38, and are located at a center part of the intermediated shaft 38 in the axis-Nl direction. The intermediate shaft 38 is supported at both ends by the main casing 43 with rolling bearings 48a, 48b.

The main casing 43 forms a contour of the speed reduction unit 31 and wheel hub bearing unit 11, is formed in the shape of a tube, and, as shown in FIG. 2, encloses the axes O, Nf, Nl, and M which extend in parallel with one another. The main casing 43 is housed in a hollow area in the road wheel W. The hollow area in the road wheel W is defined by the inner circumferential surface of a rim Wr and the spoke section Ws that is coupled to an axially outer end of the rim Wr in the axis-O direction. The wheel hub bearing unit 11, speed reduction unit 31, and an axially outer part of the motor unit 21 are housed in the hollow area in the road wheel W. An axially inner part of the motor unit 21 protrudes toward the axially inner side from the road wheel W. As described above, the road wheel W houses most of the in-wheel motor drive device 10.

Referring to FIG. 2, the main casing 43 projects downward. The projecting part of the main casing 43 is positioned away from the axis O of the output gear 40 in the front-rear direction of the vehicle, more specifically, immediately below the axis M of the input gear 33. The projecting part forms an oil tank 47. Between a lower part 43c of the main casing 43, which is positioned immediately below the axis O, and a lower part of the rim Wr formed is a space S. In the space S, a suspension member 71 is disposed so as to extend in the vehicle width direction, and an outer end 72 of the suspension member 71 in the vehicle width direction and the inner stationary member 13 are coupled to each other with a ball joint 60 in a movable manner in any direction.

The main casing 43, which is in the shape of a tube, as shown in FIG. 1, houses the input shaft 32, input gear 33, intermediate gear 34, intermediate shaft 35, intermediate gear 36, intermediate gear 37, intermediate shaft 38, intermediate gear 39, output gear 40, and output shaft 41, and also covers the axially inner end of the wheel hub bearing unit 11 in the axis-O direction. Lubricating oil is filled in the main casing 43. The input gear 33, intermediate gear 34, intermediate gear 36, intermediate gear 37, intermediate gear 39, and output gear 40 are helical gears.

The main casing 43 includes, as shown in FIG. 1, a front part 43f that is substantially flat and covers an axially outer side of a tubular part of the speed reduction unit 31, and a back part 43b that is substantially flat and covers an axially inner side of the tubular part of the speed reduction unit 31. The back part 43b is coupled to the motor casing 25. The back part 43b is also coupled to a suspension member, such as an arm and a strut, which is not illustrated, with a carrier 18. Thus, the in-wheel motor drive device 10 is supported by the suspension member.

The front part 43f has an opening 43p through which the outer ring 12 passes. The opening 43p is provided with a seal member 43s that seals an annular gap between the outer ring 12 and the front part 43f. The outer ring 12, serving as a rotating element, is housed in the main casing 43, except for an axially outer end portion thereof in the axis-O direction.

The input gear 33 having a small diameter and the intermediate gear 34 having a large diameter are disposed on an axially outer side of the speed reduction unit 31 and mesh with each other. The intermediate gear 36 having a small diameter and the intermediate gear 37 having a large diameter are disposed on an axially inner side of the speed reduction unit 31 and mesh with each other. The intermediate gear 39 having a small diameter and the output gear 40 having a large diameter are disposed on the axially outer side of the speed reduction unit 31 and mesh with each other. Thus, the input gear 33, intermediate gears 34, 36, 37, 39, and output gear 40 mesh with one another, and make up a driving-force transmission path extending from the input gear 33 to the output gear 40 via the intermediate gears 34, 36, 37, 39. The above-described mesh of the small-diameter gears and large-diameter gears allows the intermediate shaft 35 to reduce the rotational speed of the input shaft 32, the intermediate shaft 38 to reduce the rotational speed of the intermediate shaft 35, and the output shaft. 41 to reduce the rotational speed of the intermediate shaft 38. Thus, the speed reduction unit 31 can provide a sufficient speed reduction ratio. In the plurality of intermediate gears, the intermediate gear 34 serves as a first intermediate gear that is located on an input side of the driving-force transmission path. In the plurality of intermediate gears, the intermediate gear 39 serves as a final intermediate gear that is located on an output side of the driving-force transmission path.

As shown in FIG. 2, the output shaft 41, intermediate shaft 38, and input shaft 32 are located in this order, at intervals, in the front-rear direction of the vehicle. In addition, the intermediate shaft 35 and intermediate shaft 38 are positioned higher than the input shaft 32 and output shaft 41. According to the first embodiment, the intermediate shafts can be disposed above the outer ring 12 serving as a wheel hub, thereby providing a space for the oil tank 47 below the outer ring 12, and also providing a space S immediately below the outer ring 12. Therefore, a vertically-extending kingpin axis can be provided so as to cross the space S, and the road wheel W and in-wheel motor drive device 10 can properly turn about the kingpin axis.

According to the embodiment, as shown in FIG. 2, the axis M of the motor unit 21 is offset from the axis O of the wheel hub bearing unit in the front-rear direction of the vehicle, the axis Nf of the intermediate shaft 35 is offset upward from the axis O of the wheel hub bearing unit, and the axis Nl of the intermediate shaft 38 is offset upward from the axis O of the wheel hub bearing unit. This arrangement can create the space S between the lower part 43c, which is situated immediately below the axis O, and the lower part of the rim Wr in the in-wheel motor drive device 10. Therefore, the kingpin axis of the wheel assembly can be positioned so as to cross the road wheel W, thereby improving the turning property of the wheel assembly.

According to the embodiment, the input shaft 32 and output shaft 41 extend in the vehicle width direction as shown in FIG. 1, the input gear 33 and output gear 40 are in a vertical standing position as shown in FIG. 2, and the output gear 40 is disposed such that a lower edge 40b of the output gear 40 is located lower than a lower edge 33b of the input gear 33. This arrangement can prevent the fast-rotating input gear 33 from being immersed in lubricating oil pooled below the speed reduction unit 31 in the main casing 43, and therefore avoid agitation resistance to the input gear 33.

According to the embodiment, as shown in FIG. 2, the intermediate shafts 35 and 38 are, respectively, a first intermediate shaft 35 that is disposed almost adjacent to and above the input shaft 32 and is supplied with driving torque from the input shaft 32, and a final intermediate shaft 38 that is disposed almost adjacent to and above the output shaft 41 and supplies driving torque to the output shaft 41. The input shaft 32, first intermediate shaft 35, final intermediate shaft 38, and output shaft 41 are disposed such that a base line obtained by sequentially connecting the center (axis M) of the input shaft, the center (axis Nf) of the first intermediate shaft 35, the center (axis Nl) of the final intermediate shaft 38, and the center (axis O) of the output shaft 41 creates an upside-down U letter shape when viewed in the axial direction of the intermediate shafts 35, 38. This arrangement shrinks the entire layout of the shafts and gears making up the driving-force transmission path, and therefore the shafts and gears can be housed inside the road wheel W.

According to the embodiment, as shown in FIG. 1, the outer ring 12 serving as a wheel hub is a tubular component, and the wheel hub bearing unit 11 further includes the stationary shaft 15 that is placed in the center bore of the outer ring 12 to rotatably support the outer ring 12. This configuration makes it possible to coaxially couple the output gear 40 with the outer ring 12 on the radially outer side of the outer ring 12. Consequently, the outer ring 12 can receive driving force transmitted from the intermediate shaft 38, which is offset with respect to the outer ring 12 as a center.

The main casing 43 further houses, as shown in FIG. 1, a pump shaft 51, rolling bearings 52a, 52b, a pump gear 53, and an oil pump 54. The pump shaft 51 has an axis P extending in parallel with the axis O of the output shaft 41. In addition, the pump shaft 51 is disposed apart from the output shaft 41 in the front-rear direction of the vehicle, is rotatably supported at both ends in the axis-P direction by the rolling bearings 52a, 52b, and is coaxially coupled to the pump gear 53 at an axially center part of the pump shaft 51 in the axis-P direction. The pump gear 53 is in mesh with the output gear 40.

The oil pump 54 is disposed further inward of the rolling bearing 52b in the axis-P direction, and is provided on an axially inner end of the pump shaft 51 in the axis-P direction. The oil pump 54 driven by the output gear 40 draws the lubricating oil up from the oil tank 47, and discharges the drawn lubricating oil to the motor unit 21 and speed reduction unit 31. Accordingly, the motor unit 21 and speed reduction unit 31 are lubricated.

Referring to FIG. 2, the pump shaft 51 in the first embodiment is disposed below the input shaft 32, while the oil tank 47 is disposed below the pump shaft 51. The oil pump 54 (FIG. 1) is disposed substantially coaxially with the pump shaft 51, and draws up the lubricating oil pooled in the oil tank 47 toward immediately above the oil tank 47. The pump shaft 51 and oil tank 47 are disposed forward of the output shaft 41 in the front-rear direction of the vehicle. When the vehicle runs with the wheels W driven by the in-wheel motor drive devices 10, the oil tanks 47 catch wind coming from the front side of the vehicle and are air-cooled.

Next, the coupling structure between the main casing 43 and inner stationary member 13 will be described.

The inner stationary member 13 is cantilevered so as to have a free end on the axially outer side and a fixed end on the axially inner side. More specifically, as shown in FIG. 1, the stationary shaft 15 of the inner stationary member 13 has an axially inner end face 15n in the axis-O direction facing an axially outer wall face 43bm of the back part 43b in the axis-O direction. The stationary shaft 15 has a projecting portion 15p projecting radially outward from the root portion 15r. The projecting portion 15p is secured to the axially outer wall face 43bm of the back part 43b in the axis-O direction. In the back part 43b, which is one of wall parts making up the main casing 43, the axially outer wall face 43bm in the axis-O direction is a wall face oriented toward the outer side in the vehicle width direction, and is an inner wall face of the main casing 43.

The projecting portion 15p is secured to the back part 43b with a bolt 13c. The axially outer wall face 43bm of the back part 43b in the axis-O direction has a female threaded hole 43t oriented outward in the axial direction. The bolt 13c extending in parallel with the axis O has a head 13cd on the axially outer side of the bolt 13c in the axis-O direction, and a shank 13ct on the axially inner side in the axis-O direction, and the shank 13ct passes through the projecting portion 15p and is threadedly engaged in the female threaded hole 43t.

Next, referring to FIG. 3, the link structure between the in-wheel motor drive device 10 and suspension member 71 will be described.

Figure 3:
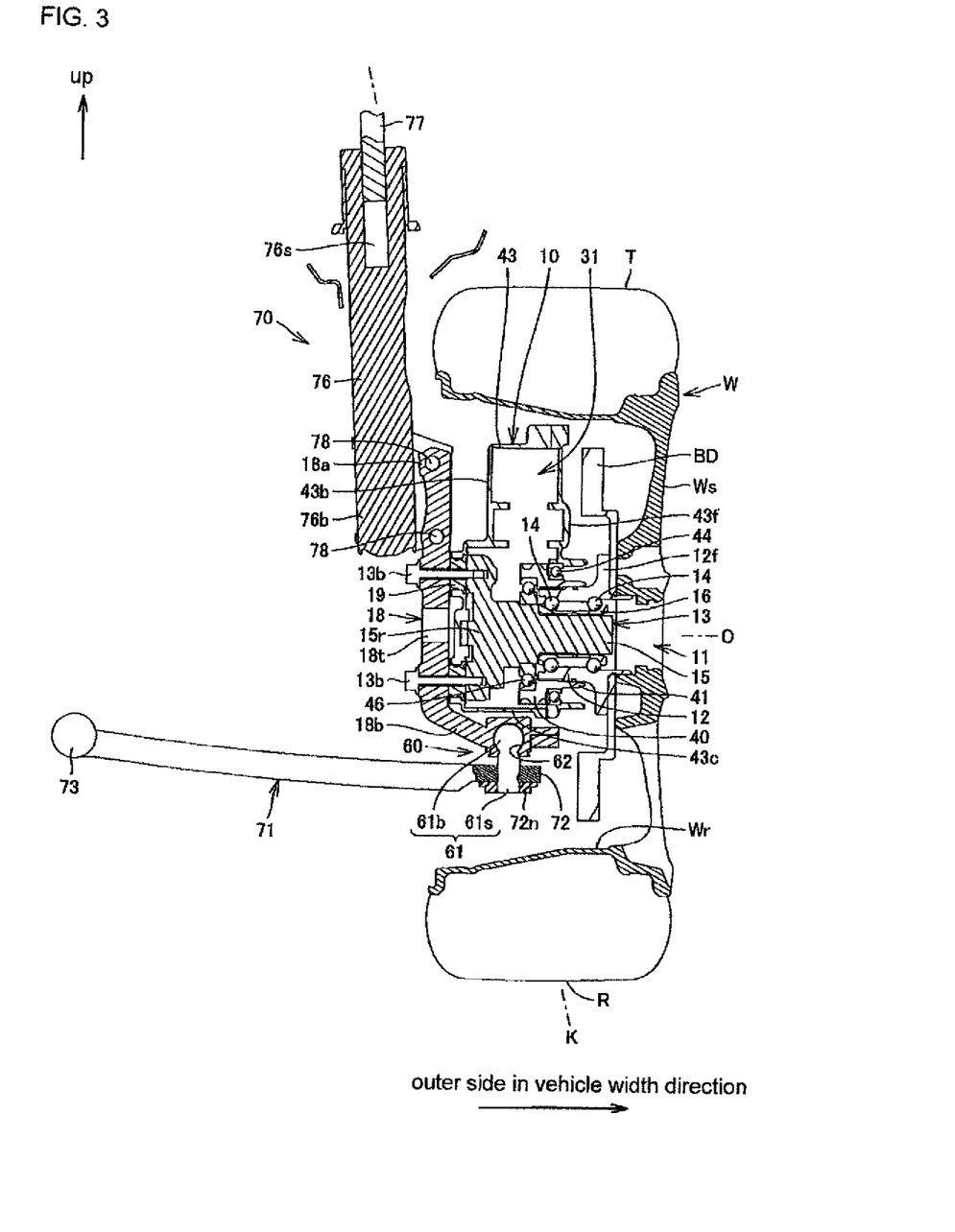
FIG. 3 is a cross-sectional view of the in-wheel motor drive device of the first embodiment with a suspension device.

FIG. 3 is a cross-sectional view showing the link structure between the in-wheel motor drive device and a suspension device 70, as viewed in the front-rear direction of the vehicle. A spoke section Ws of the road wheel W and a brake rotor BD are attached and secured to the flange 12f of the outer ring 12. A caliper, which is not illustrated, is attached and secured to rearward of the main casing 43 in the front-rear direction of the vehicle. The caliper brakes the brake rotor BD. In order to provide clear understanding of the present invention, the brake rotor BD, which is supposed to be disposed in the hollow area in the road wheel W, is omitted from the drawings, except for FIG. 3. The outer ring 12 is disposed on the outer side in the vehicle width direction with respect to the center of the road wheel W (the center from one end to the other end of the road wheel W on the axis O).

The suspension device 70 is a strut-type suspension device including two suspension members 71, 76. The suspension member 76 is a vertically extending strut incorporating a shock absorber 76s that is extensible and compressible vertically. A coil spring, which is not illustrated, is coaxially disposed on the outer circumference of an upper end region 77 of the suspension member 76 to ease the vertical axial force acting on the suspension member 76. The suspension member 76 has an upper end that supports the vehicle body, which is not illustrated.

The suspension member 71 is a lower arm (suspension arm) disposed lower than the suspension member 76 and extending in the vehicle width direction. The suspension member 71 has an outer end 72 in the vehicle width direction and an inner end 73 in the vehicle width direction. The suspension member 71 is coupled to the in-wheel motor drive device 10 at the outer end 72 in the vehicle width direction with a ball joint 60. In addition, the suspension member 71 is coupled to a vehicle body member, which is not illustrated, at the inner end 73 in the vehicle width direction. The suspension member 71 is swingable vertically with the inner end 73 as a base end and the outer end 72 as a free end. Note that the vehicle body member is a component attached to the vehicle body side as viewed from the components of interest.

The ball joint 60 includes a ball stud 61 and a socket 62. The ball stud 61 extends vertically, and has a ball 61b formed on the upper end thereof and a stud 61s formed on the lower end. The socket 62 is provided to the inner stationary member 13, and slidably houses the ball 61b. The stud 61s vertically passes through the outer end 72. The stud 61s has male threads cut around the lower end surface, and is attached and secured to the suspension member 71 by a nut 72n screwed in from below.

The carrier 18 is, as shown in FIG. 1, coupled to the stationary shaft 15 and back part 43b with bolts 13b. The stationary shaft 15 has a projecting portion 15p formed at the root portion 15r. A female threaded hole 15t is formed in the projecting portion 15p. The bolts 13b are inserted from the axially inner side to the axially outer side in the axis-O direction into through holes of the carrier 18 and through holes of an intermediate member 19 to threadedly engage the shanks thereof in the female threaded hole 15t.

The intermediate member 19 is interposed between the projecting portion 15p and carrier 18. The intermediate member 19 fits in an opening 43q formed in the back part 43b. A seal member 49 is attached around the entire circumference of the intermediate member 19. The seal member 49 seals the annular gap between the opening 43q and intermediate member 19.

With respect to the back part 43b, which is a wall part of the main casing 43, the stationary shaft 15 is disposed inside the main casing 43, while the carrier 18 is disposed outside the main casing 43.

The carrier 18 has an upper arm 18a extending upward and a lower arm 18b extending downward as shown in FIG. 3. The upper arm 18a projects upward beyond the wheel hub bearing unit 11, and is attached and secured at an end to a lower end 76b of the suspension member 76 (strut) with a bolt 78. The lower arm 18b projects downward beyond the wheel hub bearing unit 11, and has an end with the socket 62 of the ball joint 60 formed thereon. The lower arm 18b changes its orientation at the end so as to extend in parallel with the axis O to reach immediately below the wheel hub bearing unit 11. Thus, the position of the socket 62 in the axis-O direction overlaps the position of the stationary shaft 15 in the axis-O direction.

The ball 61b serves as a linkage point between the in-wheel motor drive device 10 and suspension device 70, that permits them to rotatably move in any direction. A straight line extending vertically through the upper end of the suspension member 76 (strut) and the ball 61b is a kingpin axis K of the road wheel W and in-wheel motor drive device 10.

Next, a detailed description will be made about rolling bearings 44, 46 rotatably supporting the output shaft 41.

Referring again to FIG. 1, the rolling bearing 44 disposed on the outer circumferential surface of an end portion of the output shaft 41 serves as a first output-shaft bearing to rotatably support the outer end portion of the output shaft 41. The rolling bearing 46 disposed on the inner circumferential surface of an inner end portion, which is situated on the opposite side to the rolling bearing 44 in the axis-O direction, of the output shaft 41 serves as a second output-shaft bearing to rotatably support the inner end portion of the output shaft 41. According to the embodiment, the speed reduction unit 31, in addition to the wheel hub bearing unit 11, rotatably supports the output shaft 41 using the rolling bearings 44, 46, thereby stably supporting the output shaft 41. If an external force is exerted from the road wheel W to the outer ring 12, the embodiment restricts the displacement of the output shaft 41, and therefore can prevent the output gear 40 of the speed reduction unit 31 from uneven wearing and other damage. Especially, the output shaft 41 is stably supported on both the inner circumference surface and outer circumferential surface of the output shaft 41.

The output shaft 41 has a first circular step 41t formed on the outer circumference of an axially outer end portion, adjacent to a side face of the output gear 40, so that an axially nearly center part of the output shaft 41 has a larger diameter. The first circular step 41t regulates the position of the first rolling bearing 44 in the axis-O direction by abutting against the first rolling bearing 44. According to the embodiment, the first rolling bearing 44 can be fixed so as not to displace in the axis-O direction.

The output shaft 41 has a second circular step 41u formed on the inner circumference of an axially inner end portion in the axis-O direction so that an axially nearly center part of the output shaft 41 has a smaller diameter. The second circular step 41u regulates the position of the second rolling bearing 46 in the axis-O direction by abutting against the second rolling bearing 46. According to the embodiment, the second rolling bearing 46 can be fixed so as not to displace in the axis-O direction.

Since especially the output gear 40 is a helical gear, the output gear 40 has good tooth contact with the intermediate gear 39, but exerts an axial force on the output shaft 41. According to the embodiment, the first and second rolling bearings 44, 46 that are fixed so as not to displace in the axis-O direction can receive the axial force exerted on the helical gear.

According to the embodiment, the second rolling bearing 46 provided between the inner circumferential surface of the output shaft 41 and the outer circumferential surface of the stationary shaft 15 can support the output shaft 41 together with the stationary shaft 15 having a strength greater than that of the main casing 43.

According to the embodiment, the outer ring 12 is disposed on the axially outer side in the axis-O direction, while the output shaft 41 is disposed on the axially inner side in the axis-O direction. The outer ring 12 and output shaft 41 are coupled with each other such that the inner circumferential surface of an axially outer end portion of the output shaft 41 in the axis-O direction is laid over the outer circumferential surface of an axially inner end portion of the outer ring 12 in the axis-O direction. The output shaft 41 is rotatably supported at both ends by the first rolling bearing 44 (first output-shaft bearing) rotatably supporting the outer diameter on the outer end side of the output shaft 41 and the second rolling bearing 46 (second output-shaft bearing) rotatably supporting the inner diameter on the inner end side of the output shaft 41. Thus, the first rolling bearing 44 can be disposed where the outer ring 12 of the wheel hub bearing unit 11 and the output shaft 41 of the speed reduction unit 31 are coupled with each other. Therefore, the position of the first rolling bearing 44 in the axis-O direction can be overlapped the position of the outer ring 12 in the axis-O direction, thereby reducing the total dimension of the outer ring 12 and output shaft 41 in the axial direction.

In addition, according to the embodiment, the output gear 40 is provided on the outer circumference of the axially inner end portion of the output shaft 41 in the axis-O direction such that the position of the output gear 40 in the axis-O direction overlaps the position of the rolling bearing 46 in the axis-O direction, thereby reducing the dimension of the output shaft 41 in the axis-O direction.

In addition, the rolling bearing 44 of the embodiment is a radial bearing including an outer raceway 44f on a radially outer side, an inner raceway 44g on a radially inner side, a plurality of rolling elements 44b rolling on the outer raceway 44f and inner raceway 44g, and a cage, which is not illustrated, defining the pitch between the neighboring rolling elements 44b in the circumferential direction. The outer raceway 44f and inner raceway 44g are circumferential grooves which are semicircular in cross section. The maximum outer diameter of the outer raceway 44f is smaller than the outer diameter of the addendum circle of the output gear 40. According to the embodiment, the radial dimension of the first rolling bearing 44 can be reduced, and the radial dimension of the wheel hub bearing unit 11 can be also reduced accordingly. Thus, a space for the wheel hub bearing unit 11 can be ensured in the hollow area in the road wheel W.

Figure 4:
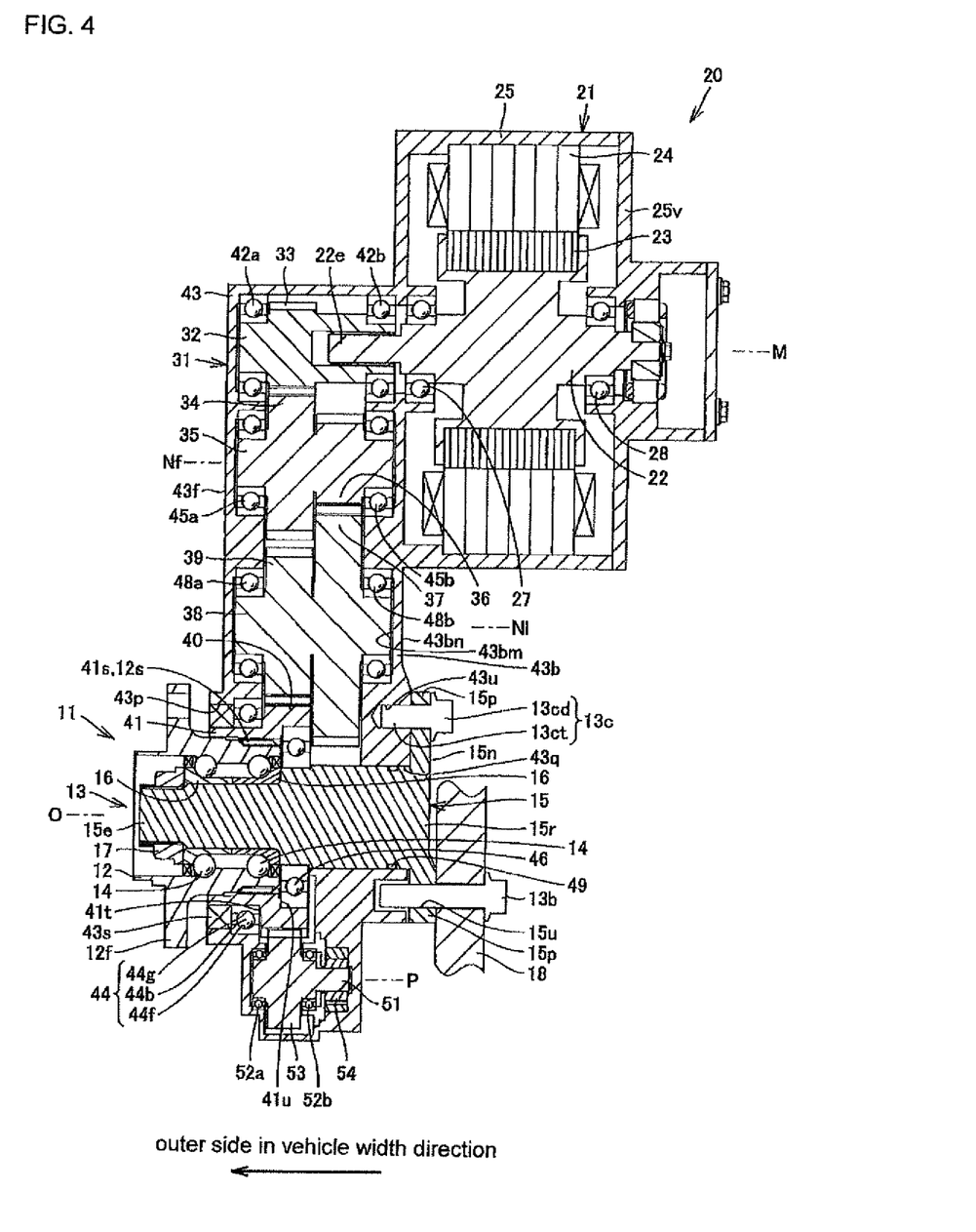
FIG. 4 is a developed cross-sectional view of an in-wheel motor drive device according to the second embodiment of the present invention, the in-wheel motor drive device being cut along a predetermined plane and developed.

Next, the second embodiment of the present invention will be described. FIG. 4 is a developed cross-sectional view of an in-wheel motor drive device 20 according to the second embodiment of the present invention, the in-wheel motor drive device 20 being cut along a predetermined plane and developed. In the second embodiment, components common with those in the previous embodiment are marked with the same numerals and symbols and will not be further explained, but different components will be described below. In the second embodiment, the back part 43b of the main casing 43 has an opening 43q into which the stationary shaft 15 is inserted from the outside of the main casing 43. With respect to the back part 43b, the root portion 15r of the stationary shaft 15, a carrier 18, and bolts 13c, 13b are disposed outside the main casing 43, while the remaining parts of the stationary shaft 15, except for the root portion 15r, are disposed inside the main casing 43.

In the axially inner wall face 43b n of the back part 43b in the axis-O direction formed is the female threaded hole 43u oriented axially inward. The bolt 13c that is oriented in the direction opposite to the bolt 13c in the above-described first embodiment is inserted into a through hole formed in the projecting portion 15p from the inner side to the outer side in the axis-O direction. The head 13cd of the bolt 13c makes contact with the projecting portion 15p from the outside of the main casing 43. The shank 13ct of the bolt 13c is threadedly engaged in the female threaded hole 43u. The seal member 49 seals the annular gap between the opening 43q and stationary shaft 15.

The stationary shaft 15 has bottomless female threads 15u cut in the projecting portion 15p. A bolt 13b passing through the projecting portion 15p is threadedly engaged with the female threads 15u to secure the carrier 18 to the projecting portion 15p in a contact manner. Although it is not illustrated, the female threads 15u may have a bottom.

The second embodiment shown in FIG. 4 also has a first rolling bearing 44 and a second rolling bearing 46 as the aforementioned first embodiment does. Therefore, the output shaft 41 can be stably supported by the bearings 44, 46.

In addition, when the in-wheel motor drive device 20 of the second embodiment is assembled, the stationary shaft 15 is inserted into the opening 43q of the main casing 43 from the axially inner side in the axis-O direction, and a top portion 15e of the stationary shaft 15 is disposed on the axially outer side relative to the back part 43b in the axis-O direction, while the motor unit 21 and the root portion 15r of the stationary shaft 15 are disposed on the axially inner side relative to the back part 43b in the axis-O direction. Referring again to FIG. 2, the stationary shaft 15 is disposed close to the motor unit 21 indicated by a phantom line. To prevent the stationary shaft 15 from interfering with the motor unit 21 in the assembling process, the stationary shaft 15 is designed with great precision.

On the other hand, when the in-wheel motor drive device 20 of the first embodiment shown in FIG. 1 is assembled, the stationary shaft 15 can be inserted into the main casing 43 from the axially outer side in the O-axis direction to attach and secure itself to the back part 43b, and the root portion 15r is disposed on the axially outer side relative to the back part 43b in the O-axis direction, while the motor unit 21 is disposed on the axially inner side relative to the back part 43b in the O-axis direction. Therefore, even the stationary shaft 15 of the first embodiment designed to be thicker than that of the second embodiment does not cause any problems in assembling.

Figure 5:
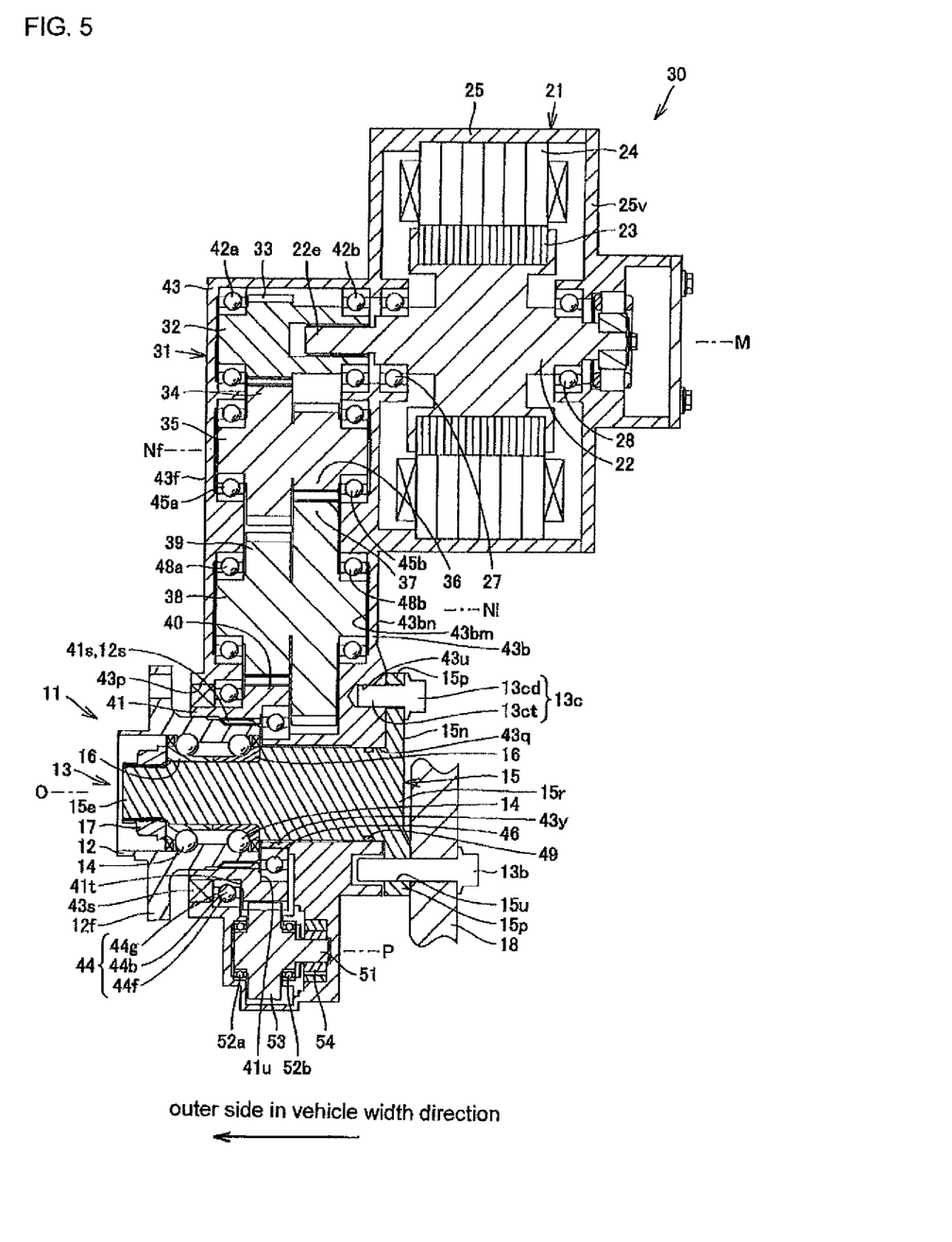
FIG. 5 is a developed cross-sectional view of an in-wheel motor drive device according to the third embodiment of the present invention, the in-wheel motor drive device being cut along a predetermined plane and developed.

Next, the third embodiment of the present invention will be described. FIG. 5 is a developed cross-sectional view of an in-wheel motor drive device 30 according to the third embodiment of the present invention, the in-wheel motor drive device 30 being cut along a predetermined plane and developed. In the third embodiment, components common with those in the previous embodiments are marked with the same numerals and symbols and will not be further explained, but different components will be described below. In the third embodiment, the main casing 43 has a cylindrical part 43y in the back part 43b.

The cylindrical part 43y extends along the axis O, projects from the axially outer wall face 43bm in the axis-O direction, further extends axially outward beyond the intermediate gear 37 in the axis-O direction, and is inserted in a center bore of the output shaft 41. The center bore of the cylindrical part 43y is an opening 43q into which a stationary shaft 15 is inserted from the outside of the main casing 43.

A second rolling bearing 46 is provided in an annular gap between an outer circumferential surface of an end portion of the cylindrical part 43y and an inner circumferential surface of an axially inner end portion of the output shaft 41 in the axis-O direction. This configuration allows the cylindrical part 43y to rotatably support the axially inner end portion of the output shaft 41 in the axis-O direction.

The third embodiment shown in FIG. 5 also has a first rolling bearing 44 and a second rolling bearing 46 as the aforementioned first embodiment does. Therefore, the output shaft 41 can be stably supported by the bearings 44, 46. However, if the cylindrical part 43y is thick, the radial dimension of the output shaft 41 increases. On the other hand, if the cylindrical part 43y is thin, its support rigidity decreases. For these reasons, the aforementioned first and second embodiments are preferable.

Figure 6:
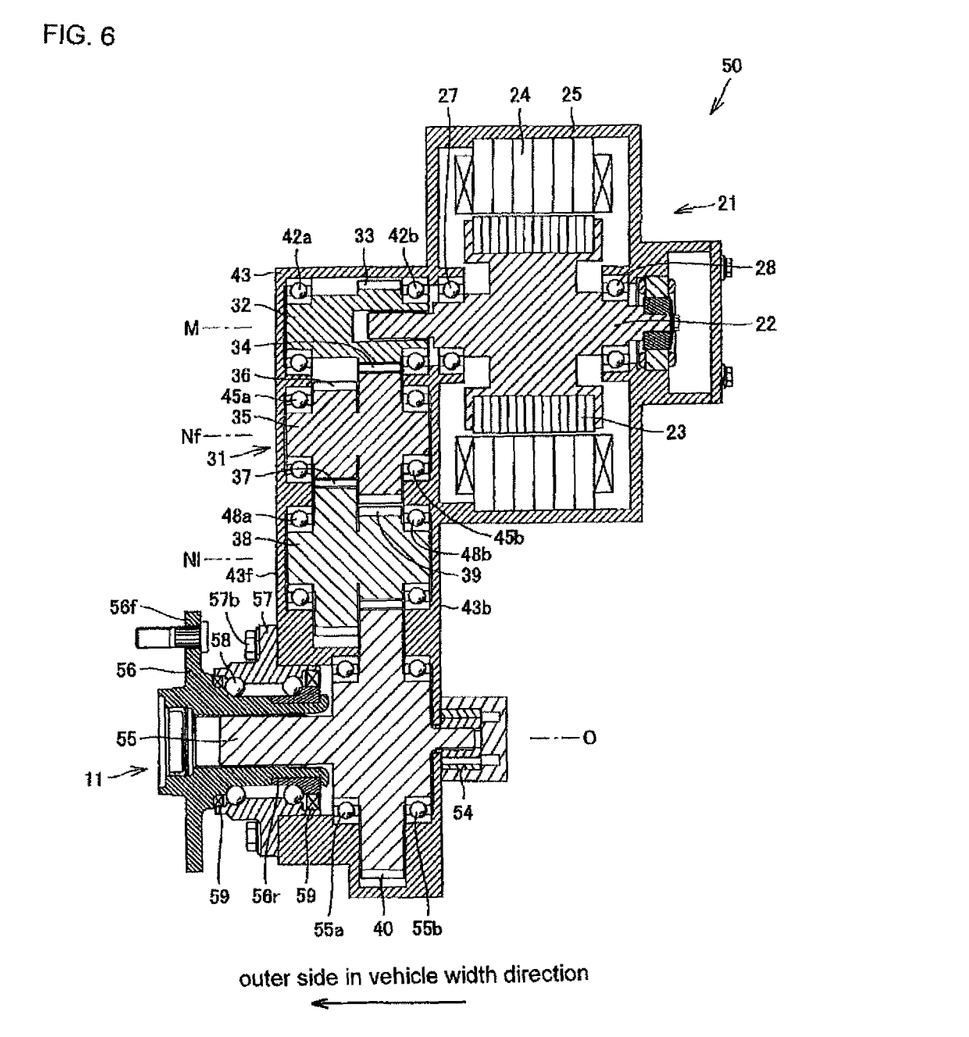
FIG. 6 is a developed cross-sectional view of an in-wheel motor drive device according to the fourth embodiment of the present invention, the in-wheel motor drive device being cut along a predetermined plane and developed.

Next, the fourth embodiment of the present invention will be described. FIG. 6 is a developed cross-sectional view of an in-wheel motor drive device 50 according to the fourth embodiment of the present invention, the in-wheel motor drive device 50 being cut along a predetermined plane and developed. In the fourth embodiment, components common with those in the previous embodiments are marked with the same numerals and symbols and will not be further explained, but different components will be described below. In the fourth embodiment, the wheel hub bearing unit 11 is configured to have a rotatable inner ring and a fixed outer ring. The fourth embodiment is different in this point from the aforementioned first to third embodiments adopting the wheel hub bearing unit 11 including a rotatable outer ring and a fixed inner ring.

As shown in FIG. 6, the wheel hub bearing unit 11 includes an inner ring 56, which is a rotary element, an outer ring 57, which is a stationary element, and a plurality of rolling elements 58 arranged in an annular gap between the inner ring and outer ring. The outer ring 57 has a flange standing on the outer circumferential surface. The outer ring flange has through holes spaced apart in the circumference direction thereof. Each through hole extends in parallel with the axis O, and allows a bolt 57b to pass therethrough from the outer side in the axis-O direction. The shank of each bolt 57b is threadedly engaged in a female threaded hole that has been drilled in a front part 43f of a main casing 43. The bolts 57b securely couple the outer ring 57 to the front part 43f. The front part 43f is a casing wall covering an axially outer end of the speed reduction unit 31 in the axis-O direction. A back part 43b is a casing wall covering an axially inner end of the speed reduction unit 31 in the axis-O direction.

The inner ring 56 having a tubular body longer than the outer ring 57 is passed through the center bore of the outer ring 57. The inner ring 56, which projects toward the outside of the in-wheel motor drive device 50 from the outer ring 57, has a coupling portion 56f at an axially outer end portion thereof in the axis-O direction. The coupling portion 56f is a flange that coaxially couples the inner ring 56 with a brake rotor and a wheel, which are not illustrated. The inner ring 56 is attached to the wheel at the coupling portion 56f, and rotates together with the wheel.

The rolling elements 58 in double rows are arranged in an annular gap between the inner ring 56 and outer ring 57. The rolling elements are, for example, balls. The outer circumferential surface on the outer side of the inner ring 56 in the axis-O direction constructs an inner raceway for the first row of the rolling elements 58. An inner raceway ring 56r fits on the outer circumference of an axially inner end portion of the inner ring 56 in the axis-O direction, and the inner raceway ring 56r has an outer circumferential surface constructing an inner raceway for a second row of the rolling elements 58. Furthermore, a seal member 59 is interposed in the annular gap between the inner ring 56 and outer ring 57. The seal member 59 seals axially opposite ends of the annular gap in the axis-O direction to prevent entry of dust and foreign matter. An output shaft 55 of the speed reduction unit 31 is inserted into the center bore formed in an axially inner end of the inner ring 56 in the axis-O direction, and spline-fitted in the center bore.

A supplementary description will be given about the speed reduction unit 31. The fourth embodiment is in common with the first to third embodiments in that an axially outer end of the input shaft 32 in the axis-M direction is rotatably supported by the front part 43f of the main casing 43 with the rolling bearing 42a, and an axially inner end of the input shaft 32 in the axis-M direction is rotatably supported by the back part 43b of the main casing 43 with the rolling bearing 42b. The fourth embodiment, however, is different from the first to third embodiments in that the input gear 33 is coupled to the axially inner side of the input shaft 32 in the axis-M direction, and is adjacent to the rolling bearing 42b. Incidentally, the input gear 33 of the first to third embodiments is coupled to the axially outer side of the input shaft 32, and is adjacent to the rolling bearing 42a.

As shown in FIG. 6, an intermediate gear 34 is coupled to an axially inner side of an intermediate shaft 35, which is situated on the inner side of the intermediate shaft 35 in the axis-Nf direction. An intermediate gear 36 is coupled to an axially outer side of the intermediate shaft 35 in the axis-Nf direction. The fourth embodiment is different in this point from the aforementioned first to third embodiments. The intermediate gear 34 and intermediate gear 36 in the fourth embodiment are arranged in reverse from those in the first to third embodiments.

An intermediate gear 37 is coupled to an axially outer side of an intermediate shaft 38 in the axis-Nl direction. An intermediate gear 39 is coupled to an axially inner side of the intermediate shaft 38 in the axis-Nl direction. The fourth embodiment is different in this point from the aforementioned first to third embodiments.

The output shaft 55 is coupled to the output gear 40, and is rotatably supported at the axially outer side relative to the output gear 40 in the axis-O direction by the front part 43f of the main casing 43 with a rolling bearing 55a. The rolling bearing 55a is disposed between the inner circumferential surface of a circular opening formed in the front part 43f and the outer circumferential surface of the output shaft 55. The rolling bearing 55a is, for example, a ball bearing having a pitch circle diameter greater than that of the rolling elements 58. The output shaft 55 further extends outward in the axis-O direction beyond the rolling bearing 55a. An axially outer end portion of the output shaft 55 in the axis-O direction is coupled to the inner ring 56.

In addition, the output shaft 55 is rotatably supported at the axially inner side in the axis-O direction relative to the output gear 40 by the back part 43b of the main casing 43 with a rolling bearing 55b. The rolling bearing 55b is disposed between the inner circumferential surface formed on the back part 43b and the outer circumferential surface of the output shaft 55. The rolling bearing 55b is, for example, a ball bearing having a pitch circle diameter greater than that of the rolling elements 58.

The output shaft 55 further extends inward in the axis-O direction beyond the rolling bearing 55b. An axially inner end portion of the output shaft 55 in the axis-O direction extends to pass through the back part 43b, and is coupled to an oil pump 54. The oil pump 54 is attached to the outer wall face of the back part 43b so as to project from the outer wall face of the back part 43b. The oil pump 54 has an outer diameter smaller than the pitch circular diameters of the rolling bearings 55a, 55b.

The in-wheel motor drive device 50 according to the fourth embodiment includes an input shaft 32 coupled to a motor rotary shaft 22 of a motor unit 21, an input gear 33 coupled to the input shaft 32, an output shaft 55 coupled to an inner ring 56, which is a rotary ring, and an output gear 40 coupled to the output shaft 55 to make up a driving-force transmission path that reduces the rotational speed of the input gear 33 and transmits the reduced rotational speed to the output gear 40. The output shaft 55 is rotatably supported at both ends by a first output-shaft bearing (rolling bearing 55a) rotatably supporting an axially outer end side of the output shaft 55 and a second output-shaft bearing (rolling bearing 55b) rotatably supporting an axially inner end side of the output shaft 55. With this configuration, the output shaft 55 can be stably supported at both ends. Even if an external force is exerted from the wheel to the inner ring 56, the fourth embodiment can restrict the displacement of the output shaft 55, and therefore can prevent the output gear 40 of the speed reduction unit 31 from uneven wearing and other damage.

Also, the rolling bearings 55a, 55b serving as the first and second output-shaft bearings are supported by the main casing 43 of the speed reduction unit 31. Thus, the output shaft 55 is stably held in the speed reduction unit 31.

The foregoing has described the embodiments of the present invention by referring to the drawings. However, the invention should not be limited to the illustrated embodiments. It should be appreciated that various modifications and changes can be made to the illustrated embodiments within the scope of the appended claims and their equivalents. The aforementioned rolling bearings 44, 46 are ball bearings; however, the rolling bearings 44, 46 according to a modification example, which is not illustrated, may be cylindrical roller bearings or angular bearings.

INDUSTRIAL APPLICABILITY

The in-wheel motor drive device according to this invention is advantageously used in electric vehicles and hybrid vehicles.

REFERENCE SIGNS LIST 10 in-wheel motor drive device
11 wheel hub bearing unit
12 outer ring
12f flange
13 inner stationary member
13b, 13c bolt
14 rolling element
15 stationary shaft
15e top portion
15n axially inner end face
15p projecting portion
15r root portion
16 inner race
17 locknut
18 carrier
19 intermediate member
21 motor unit
22 motor rotary shaft
25 motor casing
25v motor casing cover
31 speed reduction unit
32 input shaft
33 input gear
34, 36, 37, 39 intermediate gear
35, 38 intermediate shaft
40 output gear
41 output shaft
41t first annular step
41u second annular step
43 main casing
43b back part
43p, 43q opening
43y cylindrical part
44 rolling bearing (first output-shaft bearing)
44f outer raceway
44b rolling element
44g inner raceway
46 rolling bearing (second output-shaft bearing)
47 oil tank
49 seal member
51 pump shaft
53 pump gear
54 oil pump
55 output shaft
56 inner ring
57 outer ring
58 rolling element
60 ball joint
61 ball stud
61b ball
61s stud
62 socket
70 suspension device
71 suspension member 72 outer end in the vehicle width direction
72n nut
73 inner end in the vehicle width direction
76 suspension member
76b lower end
76s shock absorber
77 upper end region
K kingpin axis
  M, Nf, Nl, O, P axis
S space
T tire
W wheel
Wr rim
Ws spoke section

The invention claimed is:

1. An in-wheel motor drive device comprising:
a motor unit that drives a wheel; a wheel hub bearing unit to which the wheel is attached; and a speed reduction unit that reduces the rotational speed of the motor unit and transmits the reduced rotational speed to the wheel hub bearing unit, wherein
the wheel hub bearing unit includes a rotary ring rotating together with the wheel, a stationary ring disposed coaxially with the rotary ring, and a plurality of rolling elements arranged in an annular gap between the rotary ring and the stationary ring,
the speed reduction unit includes an input shaft coupled to a motor rotary shaft of the motor unit, an input gear coupled to the input shaft, an output shaft coupled to the rotary ring, and an output gear coupled to the output shaft, and constructs a driving-force transmission path that reduces the rotational speed of the input gear and transmits the reduced rotational speed to the output gear, and
the output shaft is rotatably supported at both ends by a first output-shaft bearing rotatably supporting an outer end side of the output shaft and a second output-shaft bearing rotatably supporting an inner end side of the output shaft, the output shaft being coupled to the rotary ring by spline-fitting.

2. The in-wheel motor drive device according to claim 1, wherein
the rotary ring is an outer ring, and the stationary ring is included in a stationary shaft passing through a center bore of the outer ring.

3. The in-wheel motor drive device according to claim 1, wherein
the first output-shaft bearing rotatably supports an outer diameter on the outer end side of the output shaft, and
the second output-shaft bearing rotatably supports an inner diameter on the inner end side of the output shaft.

4. The in-wheel motor drive device according to claim 3, wherein
the output shaft has a first circular step formed on an outer circumference of an outer end portion thereof such that the output shaft has a larger diameter around the center thereof in the direction of an axis, and
the position of the first output-shaft bearing in the direction of the axis is regulated by the first circular step.

5. The in-wheel motor drive device according to claim 3, wherein
the output shaft has a second circular step formed on an inner circumference of an inner end portion thereof such that the output shaft has a smaller diameter around the center thereof in the direction of the axis, and
the position of the second output-shaft bearing in the direction of the axis is regulated by the second circular step.

6. The in-wheel motor drive device according to claim 4, wherein
the output gear is a helical gear.

7. The in-wheel motor drive device according to claim 3, wherein
the second output-shaft bearing is provided between an inner circumferential surface of the output shaft and an outer circumferential surface of the stationary shaft.

8. The in-wheel motor drive device according to claim 7, wherein
the outer ring is disposed on an axially outer side of the wheel hub bearing unit, the output shaft is disposed on an axially inner side of the wheel hub bearing unit, and the outer ring and the output shaft are coupled with each other such that the inner circumferential surface of the outer end portion of the output shaft is laid over an outer circumferential surface of an axially inner end portion of the outer ring,
the first output-shaft bearing rotatably supports an outer circumferential surface of the outer end portion of the output shaft, and
the second output-shaft bearing rotatably supports an inner circumferential surface of the inner end portion of the output shaft.

9. The in-wheel motor drive device according to claim 8, wherein
the output gear is provided on the outer circumference of the inner end portion of the output shaft, and
the position of the output gear in the direction of the axis overlaps the position of the second output-shaft bearing in the direction of the axis.

10. The in-wheel motor drive device according to claim 8, wherein
the first output-shaft bearing is a radial bearing including an outer raceway disposed on a radially outer side, an inner raceway disposed on a radially inner side, and a plurality of rolling elements rolling on the outer raceway and inner raceway, and
the maximum outer diameter of the outer raceway is smaller than the outer diameter of the output gear.

11. The in-wheel motor drive device according to claim 1, wherein
the stationary ring is an outer ring, and the rotary ring is an inner ring disposed in a center bore of the outer ring.

12. The in-wheel motor drive device according to claim 11, wherein
the first output-shaft bearing and the second output-shaft bearing are supported by a casing of the speed reduction unit.

* * * * *